March 7, 1944. P. J. KNAUS ET AL 2,343,461
STRAND SUPPLY APPARATUS
Filed Jan. 10, 1942
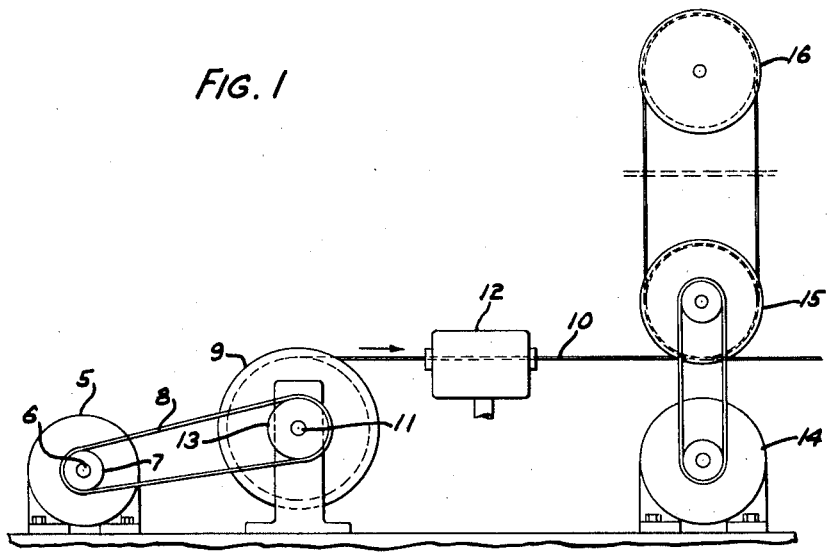
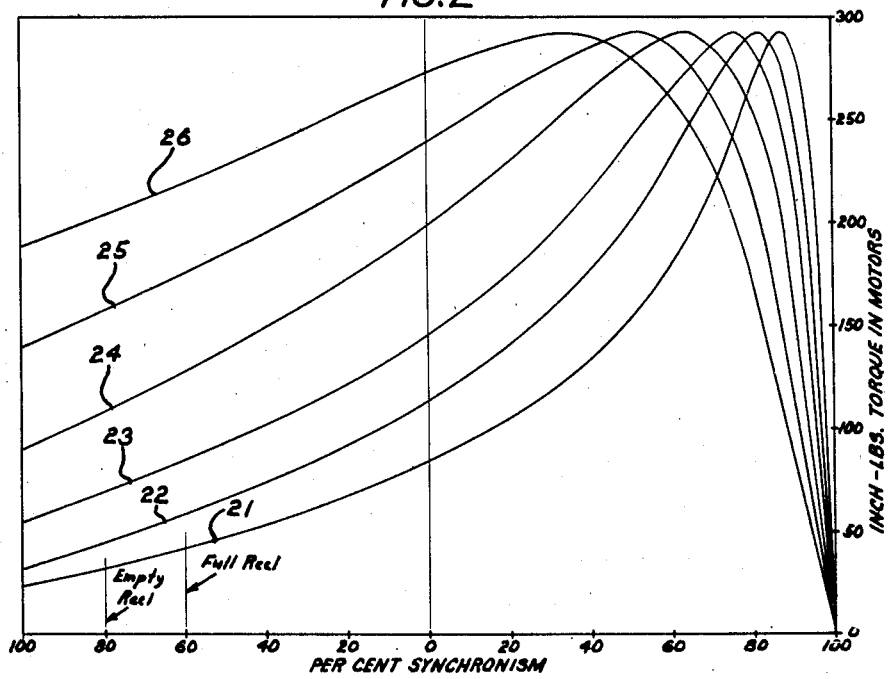
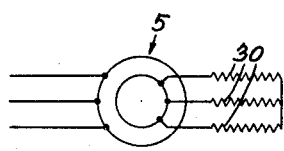
INVENTORS
P. J. KNAUS
E. W. LARSEN
BY
ATTORNEY Patented Mar. 7, 1944

2,343,461

UNITED STATES PATENT OFFICE 2,343,461

STRAND SUPPLY APPARATUS

Peter J. Knaus, Hinsdale, and Einer W. Larsen, Elmhurst, Ill., assignors to Western Electric Company, Incorporated, New York, N. Y., a corporation of New York Application January 10, 1942, Serial No. 426,300

5 Claims. (Cl. 242—45)

This invention relates to a strand supply apparatus and more particularly to an apparatus having a torque motor brake for restraining a strand supply reel.

It is often desirable, when transferring strand material from one reel to another, or when supplying strand material from a supply reel to a strand treating apparatus, to provide a brake for the supply reel. Unless some means is provided for braking the supply reel, there is danger of overrunning if the take-up speed is reduced. It is also usually desirable that there be sufficient tension on the strand to keep it taut at all times. Mechanical brakes have been used heretofore to provide a tensioning means, but they tend to become uneven in operation.

It is an object of the present invention to provide an efficient and effective apparatus for restraining a supply reel for strand material.

In accordance with this object, a torque induction motor may be connected to a supply reel by a suitable means, such as a belt, the strand on the supply reel being unwound by the machine which it supplies and current being applied to the motor in such a way as to produce a braking action on the supply reel.

Other objects and advantages will be apparent from the following detailed description taken in conjunction with the accompanying drawing, wherein Fig. 1 represents a side elevation of a torque induction motor connected to a strand supply reel;

Fig. 2 is a graphic representation of the speed torque characteristics of induction motors with different secondary resistances; and Fig. 3 shows schematically a circuit employed in accordance with this invention.

Absolutely uniform strand tension is not required for most strand treating apparatus, it being satisfactory if the tension remain within relatively broad limits; that is, the tension must not be so great as to stretch the strand nor, on the other hand, so slight as to permit slackness. Because of the torque speed performance of certain types of torque induction motors when run in reverse against their field, as will be hereinafter explained, a substantially constant and uniform tension may be obtained on the strand by means of this invention.

It has been found that it is possible to obtain a definite torque speed characteristic in a torque induction motor by selecting a certain resistance for the rotor or secondary of the motor. By using a higher resistance in the secondary, the torque speed curve tends to flatten; using a resistance of lower value, on the other hand, gives a torque speed characteristic in which the torque tends to increase very sharply as soon as the speed of the motor is reduced below synchronous speed. The torque may be made to reach its maximum at any speed merely by selecting a proper resistance for the secondary. Since the resistance used controls the torque speed characteristic when the motor is driven in reverse, as well as when it is operated forward, it will be seen that a suitable torque speed characteristic for the motor operating in reverse, may be obtained by selecting a resistance of a suitable value.

In the embodiment of this invention illustrated in Fig. 1, a multiphase or three-phase torque induction motor 5 of suitable capacity is shown having a shaft 6 and a pulley 7 mounted on this shaft. The pulley 7 is driven by a pulley 13, which is mounted on a keyed shaft 11. A belt 8 connects the two pulleys and the shaft 11 acts as a support for a supply reel 9, which is suitably keyed thereto. A strand 10 is wound on this supply reel and is pulled through a coating apparatus 12 by the capstan 15, which is driven at a substantially constant speed by the capstan motor 14. After passing around the capstan, the strand is led over drying sheaves 16, back to the capstan and thence to a suitable take-up mechanism.

Fig. 2 shows the effect on the torque speed characteristic of an induction motor of using resistances of different values in the secondary of the motor. Curve 21 shows that a relatively low resistance gives a maximum torque at a speed just below synchronous speed. Curves 22—26 show that as resistances of higher value are used in the secondary, maximum torque is obtained at lower motor speeds. Curve 21 shows a torque speed characteristic wherein the use of a relatively low resistance in the secondary gives a torque speed characteristic in reverse wherein between a speed of 60% of synchronism in reverse and a speed of 80% synchronism in reverse, the torque drops from 40 inch-pounds to 30 inch-pounds.

While only six curves have been shown, it will be understood that the range of torque speed characteristics which are available is quite extensive and is dependent, within practical limitations, only on the resistance used in the secondary of the motor. When using a low resistance motor in reverse it will be necessary to employ a larger motor than would normally be selected for a given power requirement so as to prevent overheating. In Fig. 3 a three-phase induction motor 5, such as used in accordance with this invention, is illustrated having external resistances 30 connected to the secondary thereof. It will be understood that the motor may be so constructed, however, as to have the required resistance inherently.

The problem sought to be solved by the present invention was that of maintaining a substantially uniform and constant tension on a strand as it was unwound from a supply reel. This required a braking action on the reel which would decrease as the radius of the strand take-off became smaller. This will be apparent when one considers that, as the strand take-off radius became smaller, any rotative or counter-rotative force applied to the reel would have an increasingly greater effect on the strand. Thus, if the torque exerted by the braking motor remained constant at all speeds, then, as the take-off radius of the strand became smaller, the tension on the strand would increase proportionately. This might well result in stretching or even breaking the strand.

Since the strand is unwound at a substantially constant linear speed, it is obvious that, as the strand take-off radius becomes smaller, the supporting reel will rotate faster and since this reel is connected to the torque motor used as a brake, the torque motor will likewise rotate faster. By selecting a suitable resistance in the rotor, a change in torque commensurate with the speed of the motor and satisfactory to compensate for the change in leverage on the strand resulting from the change in the radius of the strand take-off may be obtained; thus, a substantially constant and uniform tension may be obtained on the strand.

In one instance of an embodiment of this invention, a supply reel was used having a 9" inside diameter and a 12" outside diameter. Using a constant strand speed, it will be obvious that in the course of unwinding from a full reel to an empty one, the reel speed will increase one-third. Similarly, the tensioning effect of a given braking force applied to the reel will be increased by one-fourth on the strand as a result of the change in the radius of strand take-off. Thus, a torque speed relationship in the braking motor must be selected, by using a suitable resistance in the rotor, in which, over the range of speed of reel rotation to be used, the torque will be reduced by one-fourth as the speed is increased by one-third. Using a strand speed of 1300 feet per minute, a full 12" reel will rotate at approximately 414 R. P. M. An empty 9" reel would rotate then at approximately 552 R. P. M. It has been found that by using a torque induction motor of suitable power with a suitable resistance in the rotor, a torque speed relationship may be obtained which will give a substantially constant and uniform tension of any required strength on the above strand throughout the range of reel rotation speed employed; curve 21 in Fig. 2 shows a torque speed characteristic which may be used with a supply reel of the size indicated and over the speed of reel rotation indicated. It will be seen there that as the speed of rotation is increased one-third, that is, from 60% to 80% of synchronism in reverse, there is a decrease in torque of 25%. This decrease compensates for the decrease in size of the radius of strand take-off and consequent increase in leverage and results in a substantially constant tension on the strand.

While several embodiments of the invention have been described, it will be understood that many other applications are possible and that changes and modifications may be made without departing from the spirit and scope of the invention.

What is claimed is:

1. A brake for applying a counter-rotative force to a rotating object comprising a three-phase torque induction motor, having a rotating field, a rotor connected to said rotating object, resistances connected to said rotor to provide a suitable torque-speed characteristic and means for driving said rotor in reverse against its field.

2. In a strand unreeling apparatus, a strand supply reel, means for withdrawing strand from the reel, means for applying a counter-rotative braking force to the strand supply reel comprising a three-phase torque induction motor having a rotating field, a rotor connected to said reel driven in reverse against its field by said reel, and a resistance connected to said rotor to provide a suitable torque-speed characteristic.

3. In a strand unreeling apparatus, means for unreeling a strand at a substantially constant speed, a supply reel for said strand, and means for applying a constant tension to said strand, comprising a multi-phase torque induction motor having a suitable resistance in the secondary and driven in reverse against its field by said reel to exert a counter-rotative force thereon.

4. In a strand unreeling apparatus, a rotatably mounted supply reel for the strand, a multiphase torque induction motor having a resistance in the secondary of suitable value to give a torque speed relationship when the motor is driven in reverse against its field which will produce a substantially constant tension on the strand, and means for connecting said reel and said motor in driving association.

5. In a strand unreeling apparatus, means for unreeling a strand at a substantially constant speed, a rotatably mounted supply reel, a multiphase torque induction motor, means for connecting said reel to said motor so as to drive said motor, said motor having a suitable resistance in the secondary so that as the size of the radius arm of the strand take-off decreases, and consequently the speed of rotation of the reel increases, the torque of the motor will decrease so as to exert a decreasing braking or counter-rotative force on the reel and thereby maintain a substantially uniform tension on the strand.

PETER J. KNAUS.
EINER W. LARSEN.